(12) United States Patent
Ohana et al.

(10) Patent No.: US 11,269,751 B2
(45) Date of Patent: Mar. 8, 2022

(54) HIERARCHICAL EVALUATION OF MULTIVARIATE ANOMALY LEVEL

(71) Applicant: International Business Machines Corporation, Armonk, NY (US)

(72) Inventors: David Ohana, Haifa (IL); Bruno Wassermann, Ra'anana (IL); Michal Malka, Moreshet (IL)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 16/898,457

(22) Filed: Jun. 11, 2020

(65) Prior Publication Data

US 2021/0390027 A1 Dec. 16, 2021

(51) Int. Cl.
*G06F 11/30* (2006.01)
*G06F 16/22* (2019.01)
*G06F 17/18* (2006.01)

(52) U.S. Cl.
CPC ...... *G06F 11/3055* (2013.01); *G06F 16/2246* (2019.01); *G06F 17/18* (2013.01); *G06F 2201/81* (2013.01)

(58) Field of Classification Search
CPC ...... G06F 9/46; G06F 15/17362; H04K 12/26
See application file for complete search history.

(56) References Cited

U.S. PATENT DOCUMENTS

| | | | |
|---|---|---|---|
| 7,379,799 B2 | 5/2008 | Cleary | |
| 8,984,116 B2 | 3/2015 | Ge | |
| 9,497,206 B2 | 11/2016 | Bernstein | |
| 9,800,605 B2 | 10/2017 | Baikalov | |
| 10,554,518 B1* | 2/2020 | Troy de Freitas | .. H04L 41/0681 |
| 2010/0058345 A1* | 3/2010 | Seidman | ............. G06F 11/3466 718/101 |
| 2010/0177703 A1* | 7/2010 | daCosta | .................. H04L 41/12 370/328 |

(Continued)

OTHER PUBLICATIONS

Robinson J., Lonergan M., Singh L., Candido A., Sayal M. (Jun. 1, 2012) SHARD: A Framework for Sequential, Hierarchical Anomaly Ranking and Detection. In: Tan PN., Chawla S., Ho C.K., Bailey J. (eds) Advances in Knowledge Discovery and Data Mining. PAKDD 2012. Lecture Notes in Computer Science, vol. 7302. Springer, Berlin, Heidelberg.

*Primary Examiner* — Getente A Yimer
(74) *Attorney, Agent, or Firm* — G. E. Ehrlich

(57) ABSTRACT

Embodiments may include techniques for hierarchical evaluation of the anomaly level of a system and its sub-components using domain knowledge, so as to provide improved accuracy and explainability compared to conventional methods. For example a method of anomaly detection in a hierarchical computer network may comprise defining a tree-like topological structure which describes how the hierarchical computer network comprises sub-components, wherein each node of the tree-like topological structure represents a sub-component of the hierarchical computer network, and wherein at least some of the sub-components are monitored to generate signals indicating an operational condition of each sub-component, collecting a plurality of time-series of maximum absolute anomaly scores for each monitored signal, and computing an anomaly score for a root node of the tree-like topological structure.

14 Claims, 9 Drawing Sheets

(56) References Cited

U.S. PATENT DOCUMENTS

| | | | | |
|---|---|---|---|---|
| 2011/0167487 A1* | 7/2011 | Wu | ............... | H04L 63/083 |
| | | | | 726/7 |
| 2014/0279837 A1* | 9/2014 | Guo | ............... | G06F 16/22 |
| | | | | 707/603 |
| 2016/0085875 A1* | 3/2016 | Li | ............... | G06F 16/2246 |
| | | | | 707/741 |

* cited by examiner

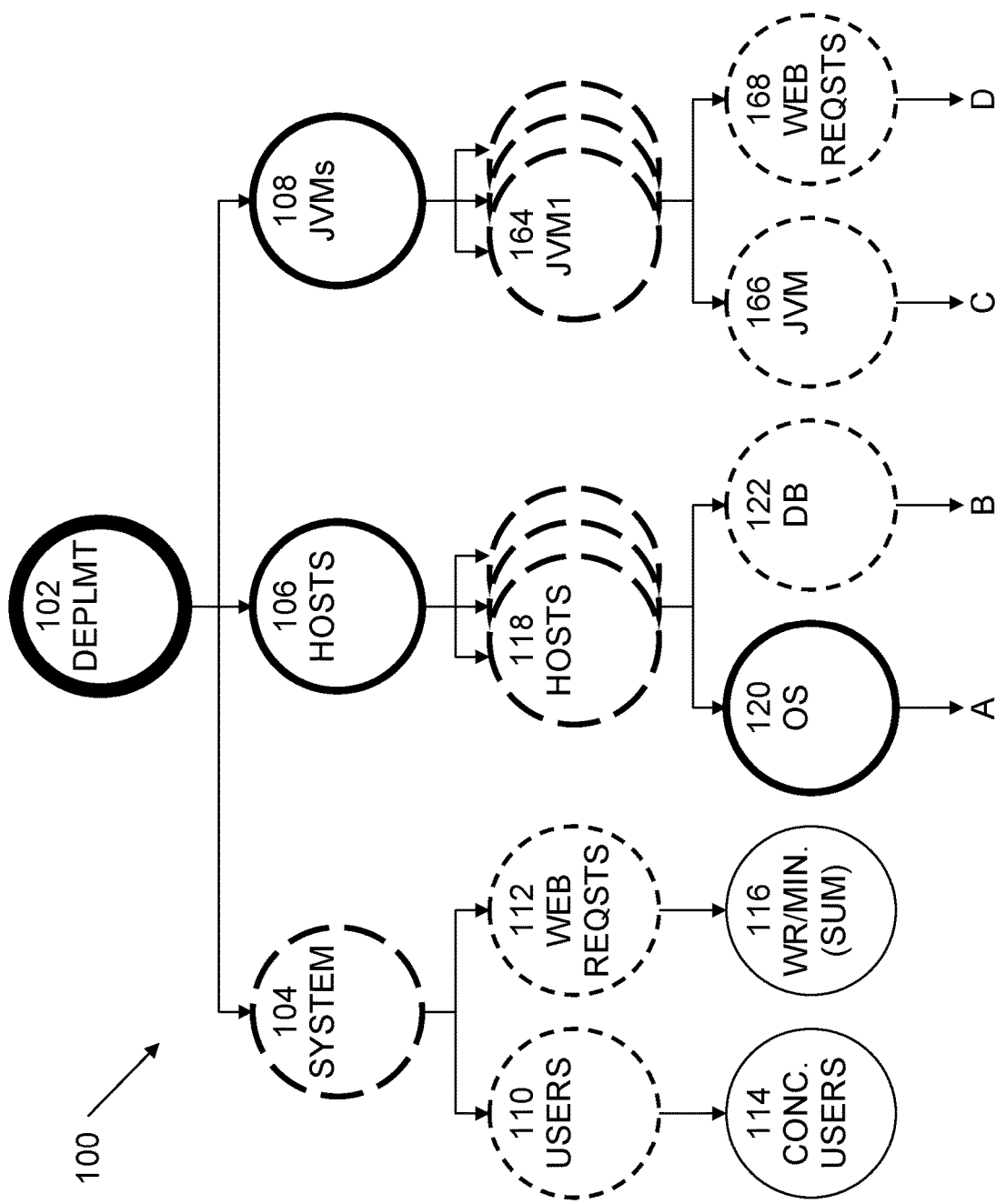

HIERARCHICAL EVALUATION OF MULTIVARIATE ANOMALY LEVEL

BACKGROUND

The present invention relates to techniques for hierarchical evaluation of the anomaly level of a system and its sub-components using domain knowledge, so as to provide improved accuracy and explainability compared to conventional methods.

The need for Anomaly Detection (AD) techniques is increasing as a method for detecting events of interest from monitoring large and complex digital systems. Such techniques typically receive as input a multitude of streaming signals from various sources in the monitored system, and produce alerts for failures, performance changes, or any other suspicious activity as output.

Manual detection of significant anomalous events in such systems is usually not practical due to the inability of a human to process large volumes of high-frequency data, resulting in events which might be missed or discovered too late.

Typically, an AD solution would map the n raw input signals into a multitude of m time-series' (the mapping series can be in another space than the space of the original input signal). After that, for each time-series, the AD solution would evaluate the difference of the latest observed value from the expected/predicted value and produce an anomaly/error score.

The next step typically involves evaluating the system-wide anomaly level. Typically, an AD solution computes a mean of anomaly values per time-series. Such a mean may be an arithmetic mean (MAE), a squared mean (MSE) or a root squared mean (RMSE).

The problems with such approaches include:

1. The assumption of an equal importance for each input signal to the final system-level anomaly measurement (SLAM). In many use-cases, this is not true. For example, if the monitored system consists of multiple heterogenous devices, some of the devices may play a more important and impactful role than others. It is also possible that some devices report more metrics than others. If each metric were weighed equally, the devices with higher numbers of signals would unduly influence the final anomaly score.

2. Such approaches only produce a single SLAM. Typically, a monitored system consists of many sub (and sub-sub) components. There might be an anomaly in one of those sub-components which is not strong enough to be reflected in the SLAM, thus resulting in undetected incidents (false negatives). Even if the SLAM is large enough to indicate an incident, for a system with thousands of signals it might be hard to understand which sub-component(s) is/are mostly responsible for the anomaly.

Accordingly, a need arises for techniques to detect anomalies in hierarchical systems that utilizes the anomaly level of a system and its sub-components, so as to provide improved detection accuracy and explainability.

SUMMARY

Embodiments may include techniques for hierarchical evaluation of the anomaly level of a system and its sub-components using domain knowledge, so as to provide improved accuracy and explainability compared to conventional methods.

Embodiments may be utilized for online scenarios, where monitored system signals are received in a streaming, real-time or near real-time fashion and alerts shall be raised as near as possible to the start of an incident, as well as for offline scenarios, where complete signals are readily available in advance.

For example, in an embodiment, a method of anomaly detection in a hierarchical computer network may be implemented in a computer system comprising a processor, memory accessible by the processor, and computer program instructions stored in the memory and executable by the processor, and the method may comprise defining a tree-like topological structure which describes how the hierarchical computer network comprises sub-components, wherein each node of the tree-like topological structure represents a sub-component of the hierarchical computer network, and wherein at least some of the sub-components are monitored to generate signals indicating an operational condition of each sub-component, collecting a plurality of time-series of maximum absolute anomaly scores for each monitored signal, and computing an anomaly score for a root node of the tree-like topological structure.

In embodiments, computing an anomaly score for a root node of the tree-like topological structure may comprise recursively computing an anomaly score for each node of the tree-like topological structure, bottom-up, by inspecting anomaly scores of child-nodes of each node, and reducing the anomaly scores into a single value using a variable aggregation function. Recursively computing an anomaly score for each node may comprise collecting weights for all immediate child nodes of each node and collecting anomaly scores for all immediate child nodes of each node. The variable aggregation function may comprise one of a weighted power mean function, an unweighted median, an unweighted percentile, a percentage of anomalies out of all child nodes, and a plurality of weighted aggregation functions. Computing an anomaly score for each node further may comprise determining a number of standard deviations by which the computed anomaly score for the node is above a mean anomaly score for that node. The method further may comprise raising an alert when a computed anomaly score for a node is above a mean anomaly score for that node by greater than a threshold number of standard deviations. The monitored signals may be one of online wherein streaming data is available in real-time or near real-time or offline wherein time series of signal data have been stored.

In an embodiment, a system for anomaly detection in a hierarchical computer network may comprise processor, memory accessible by the processor, and computer program instructions stored in the memory and executable by the processor to perform defining a tree-like topological structure which describes how the hierarchical computer network comprises sub-components, wherein each node of the tree-like topological structure represents a sub-component of the hierarchical computer network, and wherein at least some of the sub-components are monitored to generate signals indicating an operational condition of each sub-component, collecting a plurality of time-series of maximum absolute anomaly scores for each monitored signal, and computing an anomaly score for a root node of the tree-like topological structure.

In an embodiment, a computer program product for anomaly detection in a hierarchical computer network may comprise a non-transitory computer readable storage having program instructions embodied therewith, the program instructions executable by a computer, to cause the computer to perform a method that may comprise defining a tree-like topological structure which describes how the hierarchical computer network comprises sub-components, wherein each node of the tree-like topological structure represents a sub-component of the hierarchical computer network, and wherein at least some of the sub-components are monitored to generate signals indicating an operational condition of each sub-component, collecting a plurality of time-series of maximum absolute anomaly scores for each monitored signal, and computing an anomaly score for a root node of the tree-like topological structure.

BRIEF DESCRIPTION OF THE DRAWINGS

The details of the present invention, both as to its structure and operation, can best be understood by referring to the accompanying drawings, in which like reference numbers and designations refer to like elements.

FIGS. 1a, 1b, and 1c illustrate an exemplary topological representation of a Software-as-a-Service (SaaS) deployment according to embodiments of the present techniques.

DETAILED DESCRIPTION

Embodiments may include techniques for hierarchical evaluation of the anomaly level of a system and its sub-components using domain knowledge, so as to provide improved accuracy and explainability compared to conventional methods.

Embodiments may be utilized for online scenarios, where monitored system signals are received in a streaming, real-time or near real-time fashion and alerts shall be raised as near as possible to the start of an incident, as well as for offline scenarios, where complete signals are readily available in advance.

In embodiments, a prerequisite may be a prior step that produces a time-series of anomaly scores for each raw signal of the monitored system, or for a transformation of each raw signal, or for a sub-space that was created from a multitude of signals of the monitored system. Those time-series of anomaly scores may form the primary input to the processing.

Figure 1B:
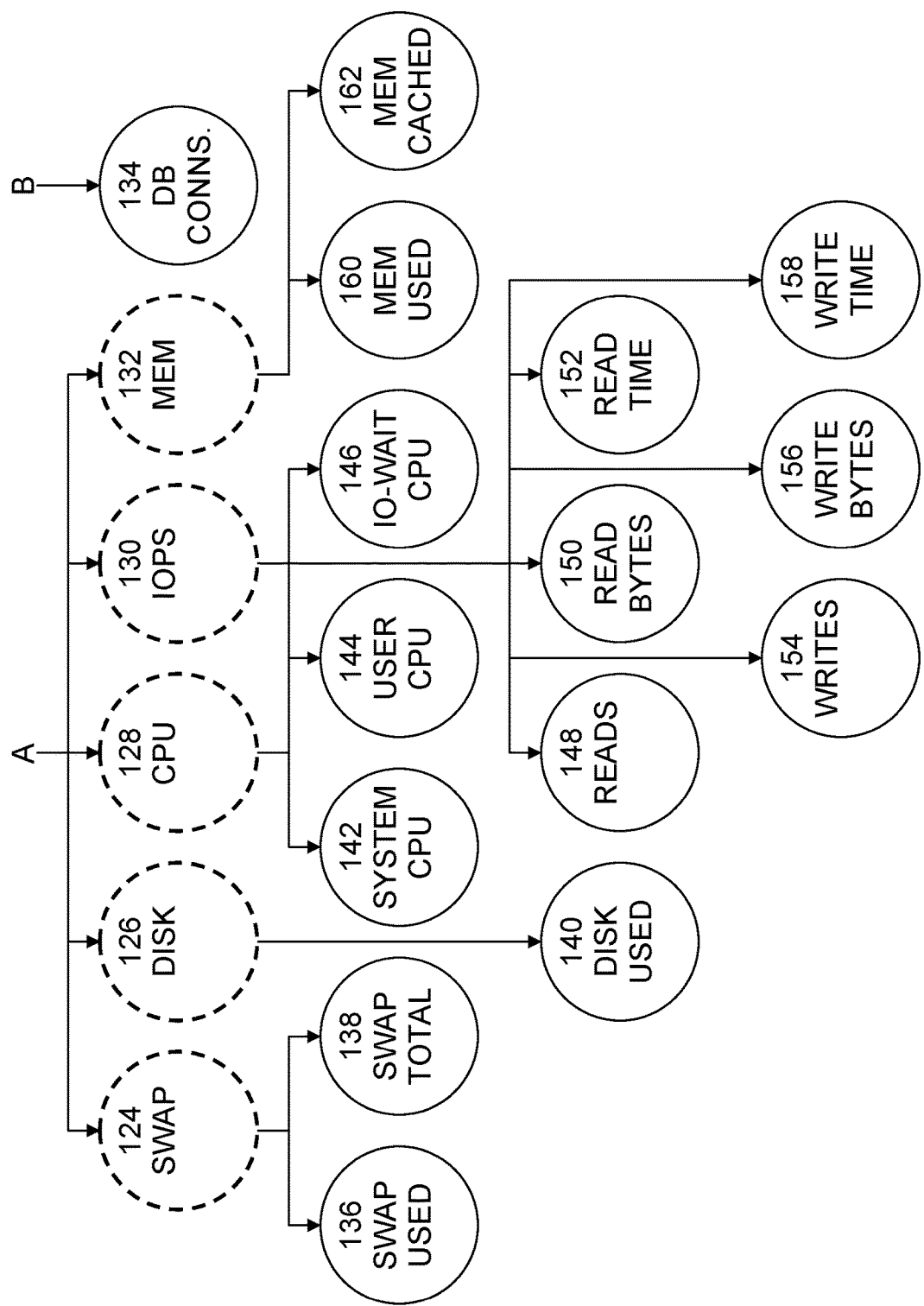
Figure 1C:
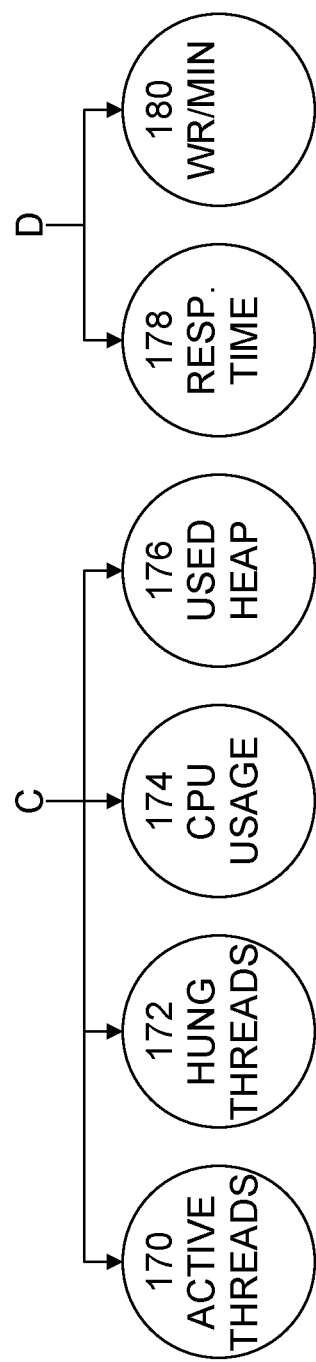

In embodiments, another prerequisite is the availability of domain knowledge in order to build a tree-like topological structure. The topology describes how the overall system comprises various sub-components. FIGS. 1a-1c illustrate an exemplary topological representation of a Software-as-a-Service (SaaS) deployment. In this example, FIGS. 1a-1c capture the topology of a multi-tier system 100, such as a hierarchical computer network, that recursively divides deployments of instances of the system into lower-level components. As shown in FIG. 1, circles with the thickest solid outlines, such as 102, represent root nodes, circles with medium thickness solid outlines, such as 106, represent auxiliary nodes, circles with the thinnest solid outlines, such as 142, represent signals, circles with the thicker dashed outline, such as 104, represent named nodes, and circles with the thinner dashed outline, such as 110, represent metric groups. In this example, a deployment 102, which may be root of system 100, may include a system 104, hosts 106, and Java Virtual Machines (JVMs) 108. System 104, which may be a named node, may include metric groups, such as users metric group 110 and web requests metric group 112. Metric groups, which are monitored entities, may produce monitoring signals. For example, users metric group 110 may produce signals relating to the concurrent users 114, while web requests metric group 112 may produce signals relating to web requests per minute 116. Hosts 106 may include named nodes hosts 118, which may include operating system (OS) 120 and database (DB) metric group 122.

Components and sub-components of system 100 may be monitored to generate signals indicating an operational condition of each component and sub-component. Turning to FIG. 1b, DB 122 metric group may produce signals such as database connections 134. OS 120 may include metric groups such as swap metric group 124, disk metric group 126, CPU metric group 128, input/output operations (IOPS) metric group 130, and memory metric group 132. Swap metric group 124 may produce signals such as swap used 136 and swap total 138, disk metric group 126 may produce signals such as disk used 140, CPU metric group 128 may produce signals such as system CPU 142, user CPU 144, and CPU input/output wait 146, IOPS metric group 130 may produce signals such as reads 148, read bytes 150, read time 152, writes 154, write bytes 156, and write time 158, and memory metric group 132 may produce signals such as memory used 160 and memory cached 162.

Returning to FIG. 1a, JVMs 108 may include a plurality of JVM named nodes 164, which may include metric groups such as JVM metric group 166 and web requests metric group 168. Turning to FIG. 1c, JVM metric group 164 may produce signals such as active threads 170, hung threads 172, CPU usage 174, and heap usage 176, and web requests metric group 168 may produce signals such as response time 178 and web request per minute 180.

Figure 2:
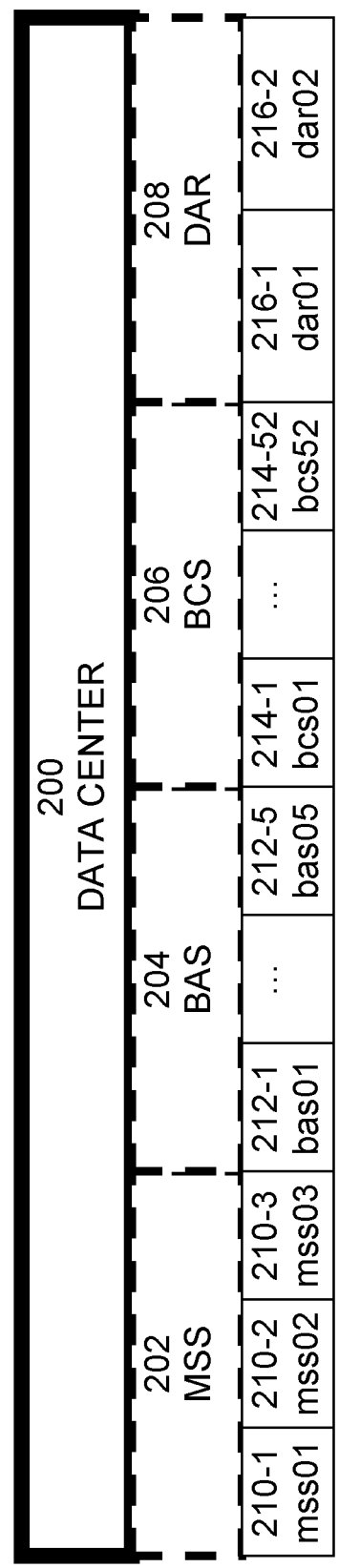
FIG. 2 illustrates an exemplary topological representation of a network infrastructure in a data center according to embodiments of the present techniques.

Similarly, as in the example shown in FIG. 2, which is a sample topological representation of a network infrastructure in a data center, the network of an entire data center 200 may be divided into multiple device types, such as Master Services Switch (MSS) 202, Backend Aggregation Switch (BAS) 204, Backend Customer Switch (BCS) 206, and Datacenter Aggregation Router (DAR) 208 and then into their corresponding hosts, such as mss01 210-1, mss02 210-2, mss03 210-3, bas01 212-1-bas05 212-5, bcs01 214-1-bcs52 214-52, dar01 216-1, and dar02 216-2. Actual signals are below the host level but are not shown in this example. The leaf nodes of the resulting tree-like structure represent the input time-series. Such topologies are meaningful to the human users of the solution, in respect to the monitored system.

Embodiments may utilize a post-order recursive computation, per time window, of an anomaly score for the root of the tree. The anomaly score per node may be computed using a function which takes as an input the anomaly scores of the child-nodes below that node, as described below. Anomaly scores of child-nodes may propagate to a parent node only if they cross some threshold (after normalization). The results of the recursive computation may be an anomaly score per topological node in the monitored system, per time window, which reflects the anomaly level of the sub-component of the monitored system which is represented by this node.

Figure 3:
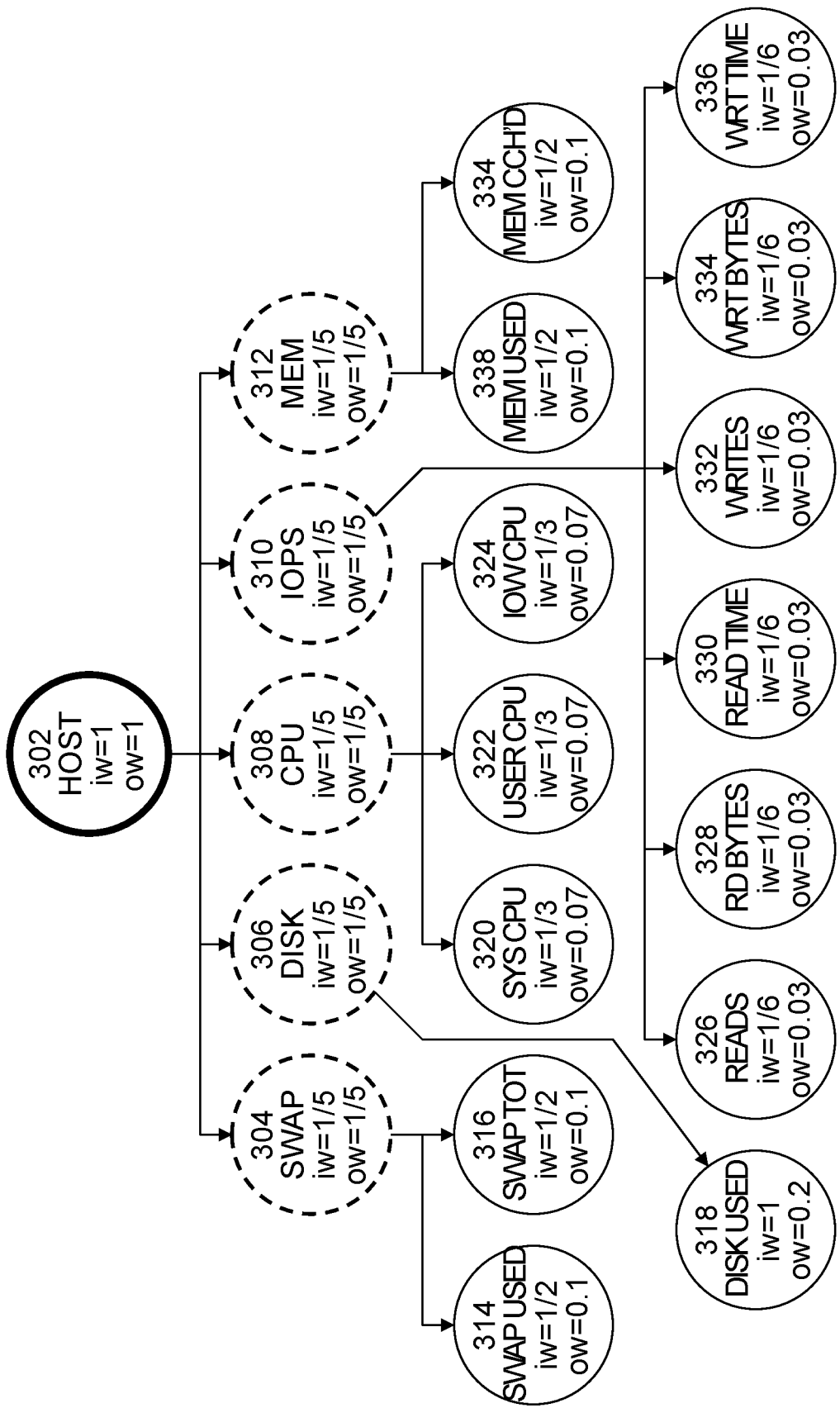
FIG. 3 illustrate an example of implicit weights derived from a topology according to embodiments of the present techniques.

Embodiments may provide advantages, such as inspection of the anomaly score per node may assist in isolation of the anomaly to a specific node/sub-component in the hierarchy; in addition to discovering a system-level anomaly, embodiments may uncover subtle anomalies, in mid-level nodes, which may not be strong enough to propagate to the root level; and embodiments may implicitly assign an equal weight for every immediate sub-node of the same parent node, no matter how many children exist below that sub-node. This may help to overcome common situations where some sub-components produce more metrics than others, for example, as shown in FIG. 3, which illustrates an example of how node weights may be derived implicitly from the topological tree. The topology presented is a subset of the deployment topology of the multi-tier system from the example shown in FIG. 1. Each node has a weight equal to its siblings' weight. As shown in this example, each node has an Inner Weight (iw), which is the weight relative to the immediate parent, and an Outer Weight (ow), which is the weight relative to the root node, in this example host node 302. The Inner Weight and Outer Weight for each node may be computed as follows:

$$iw=1/(\text{number of siblings})$$

$$ow=iw*\text{parent } iw* \ldots *\text{root } iw$$

It may be seen that the sum of ow for all weights is equal to 1.0. For example, since there are more signals 326-336 in the TOPS 310 group than there are signals 320-324 in the CPU 308 group, each TOPS metric will get smaller weight than each CPU metric.

Figure 5:
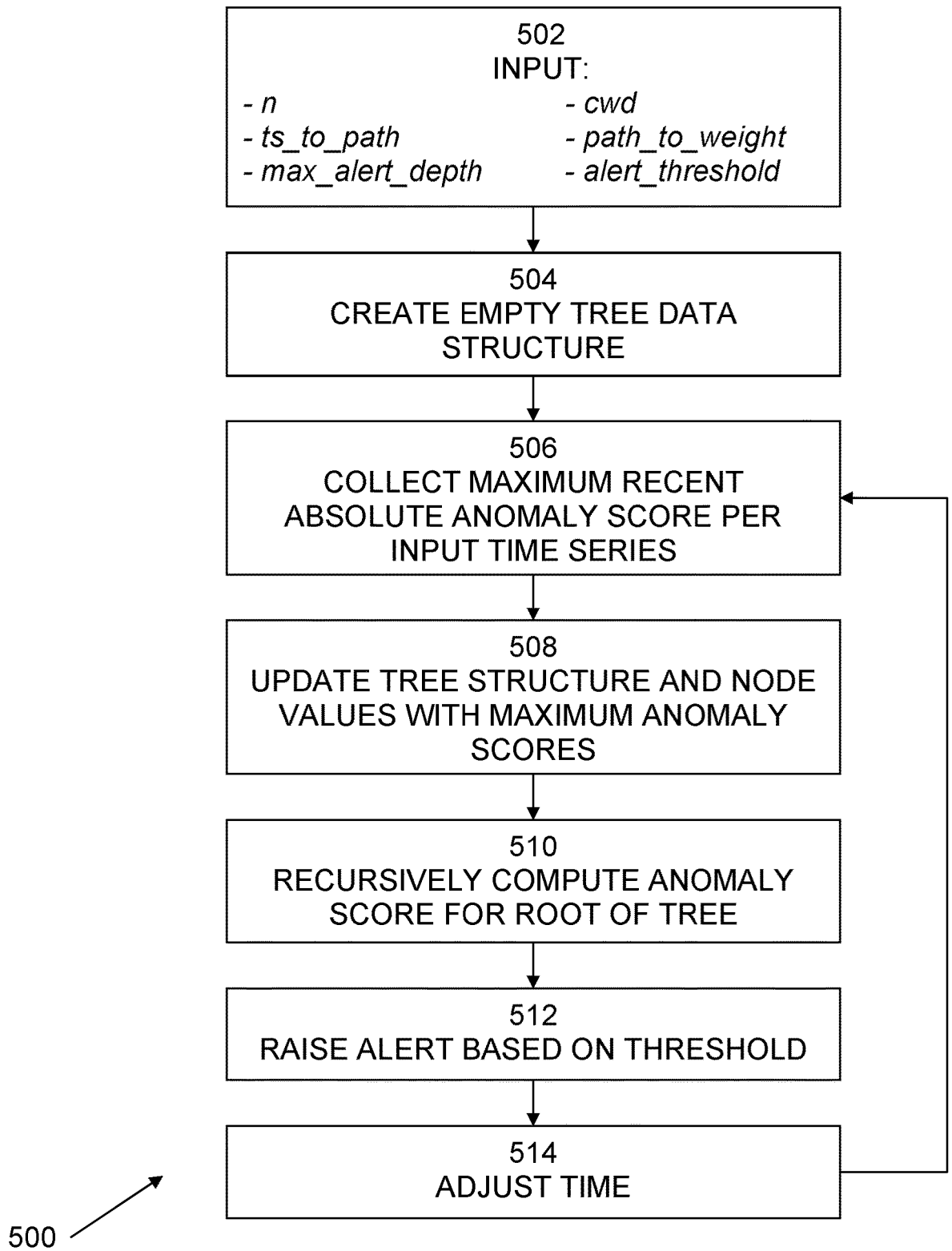
FIG. 5 is an exemplary flow diagram of a process of hierarchical evaluation of the anomaly level of a system and its sub-components using domain knowledge according to embodiments of the present techniques.

An example of a process 500 according to embodiments of the present techniques is shown in FIG. 5. Process 500 may be applied to an offline scenario, in which time series of signal data have been stored for later processing by process 500, or process 500 may be applied to an online scenario, in which streaming data available in real-time or near real-time representing signal data may form the time series and may be processed as it is generated. In this example, process 500 may begin with 502, in which inputs to the process may be received. For example, the inputs may include n, which may be a time-series of a data structure that may be defined as (time, anomaly_score). The inputs may include cwd, which may be a correlation window duration (for example, a value of 60 minutes may be a reasonable default). The inputs may include ts_to_path, which may be a mapping from a time series or time series identifier to a corresponding position in a spatial tree, which may be represented as a list of node keys. Each time series may have a unique path. The inputs may include path_to_weight, which may be an optional mapping from a tree node to an explicit weight for anomalies detected for that node, which may have a default weight of 1.0, unless specified. This mechanism may provide an opportunity to explicitly prioritize the importance of different signals. For example, in a network infrastructure scenario, signals originating from aggregate switches are more important than top-of-rack switches. The inputs may include max_alert_depth, which may indicate the maximum allowed node depth for raising an anomaly alert in case an anomaly was detected at that node. For example, a value of 0 for this parameter means that only anomalies at root node (SLAM) may produce an alert. The inputs may include alert_threshold, which may define a threshold such that a topological node with norm_anom_score equal or above this parameter value may be considered as anomalous. For example, the value may be expressed in terms of standard deviations, and a value of 3.0 may be considered a reasonable default.

At 504, an empty tree-like topological structure, such as a tree data structure, which describes how the overall system, such as a hierarchical computer network, comprises various sub-components, may be created. The node key may be a string and the node value may be a data structure containing pair including an anomaly score and a normalized anomaly score. At 506, a maximum recent absolute anomaly score may be collected for each time series of each monitored signal. For an offline scenario, a time index t may be set to a beginning time of the earliest time-series, while for an online (streaming) scenario, t may be set to the current time. Then, for each time-series ts, the maximum absolute anomaly score, which is at most cwd seconds from t may be collected. If no such value exists, then ts may be ignored.

At 508, the tree structure and node values may be updated with maximum anomaly scores. For example, the anomaly scores for all tree nodes may be set to 0, then the process may iterate over the maximum absolute anomaly scores collected at 506. For each time series/score structure (ts, max_abs_anom_score), ts_to_path[ts] may be used to get the path of a leaf node. Any missing keys specified in the path to the tree may be inserted and both anom_score and norm_anom_score of the leaf node to may be set to max_abs_anom_score.

Figure 6:
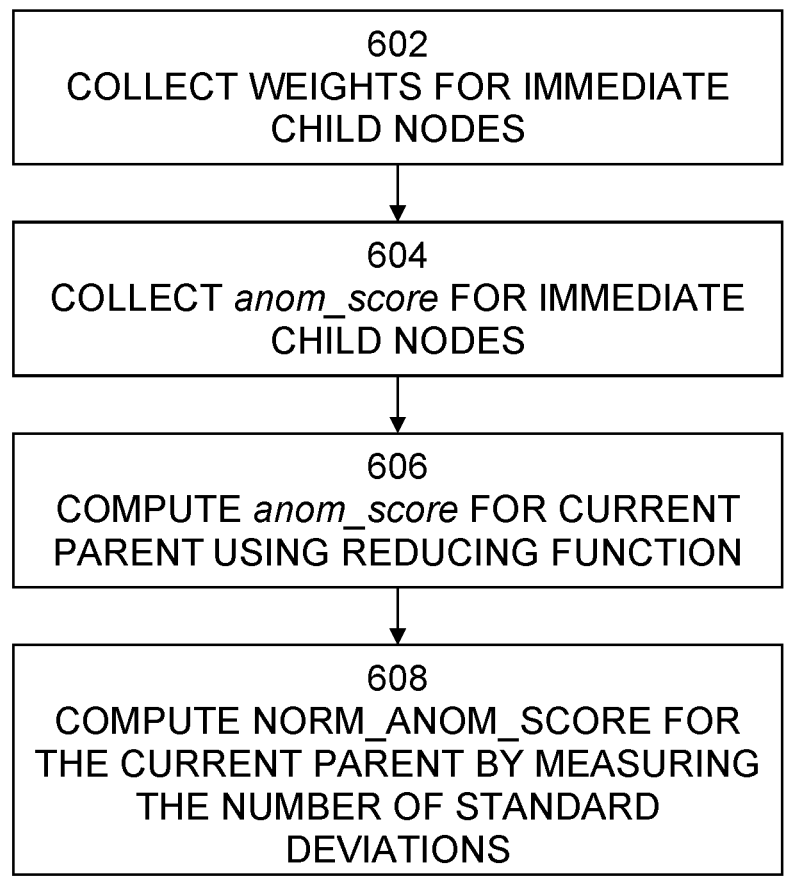
FIG. 6 is an exemplary flow diagram of a process of recursively computing an anomaly score according to embodiments of the present techniques.

At 510, the process may recursively compute an anomaly score for the root of the tree created at 508 using, for example, a post-order tree traversal. An exemplary process 510 for such a computation is shown in FIG. 6. Process 510 may begin with 602, in which weights for all immediate child nodes of the current parent node may be collected to form a list. In case explicit weights are not used, weight value of, for example, 1.0 may be used per node, effectively counting immediate children. At 604, the anom_score for all immediate child nodes of the current parent node may be collected to form a list. Optionally, anomaly scores may be collected only if norm_anom_score is above a predefined threshold instead and the anomaly scores that are not above the threshold may be set to zero.

At 606, an anom_score for the current parent node may be computed by reducing the list of anomaly scores from 604 into a single value. This may be done using any function that receives a list of values from 604 and list of weights from 602. Examples of possible aggregation functions may include:

Weighted Power Mean (which is equivalent to MAE at power=1 and to RMSE at power=2, when all weights are 1.0).

Median or another percentile (weights not applicable)

Percentage of anomalies out of all children

Any weighted ensemble of aggregation functions, for example, 50% weight for max anomaly score and 50% weight for Weighted Power Mean.

At 608, a norm_anom_score for the current parent node may be computed by determining or measuring the number of standard deviations by which the last anom_score from 606 is above the mean anom_score for that node. This may also be called a standard score.

Figure 4:
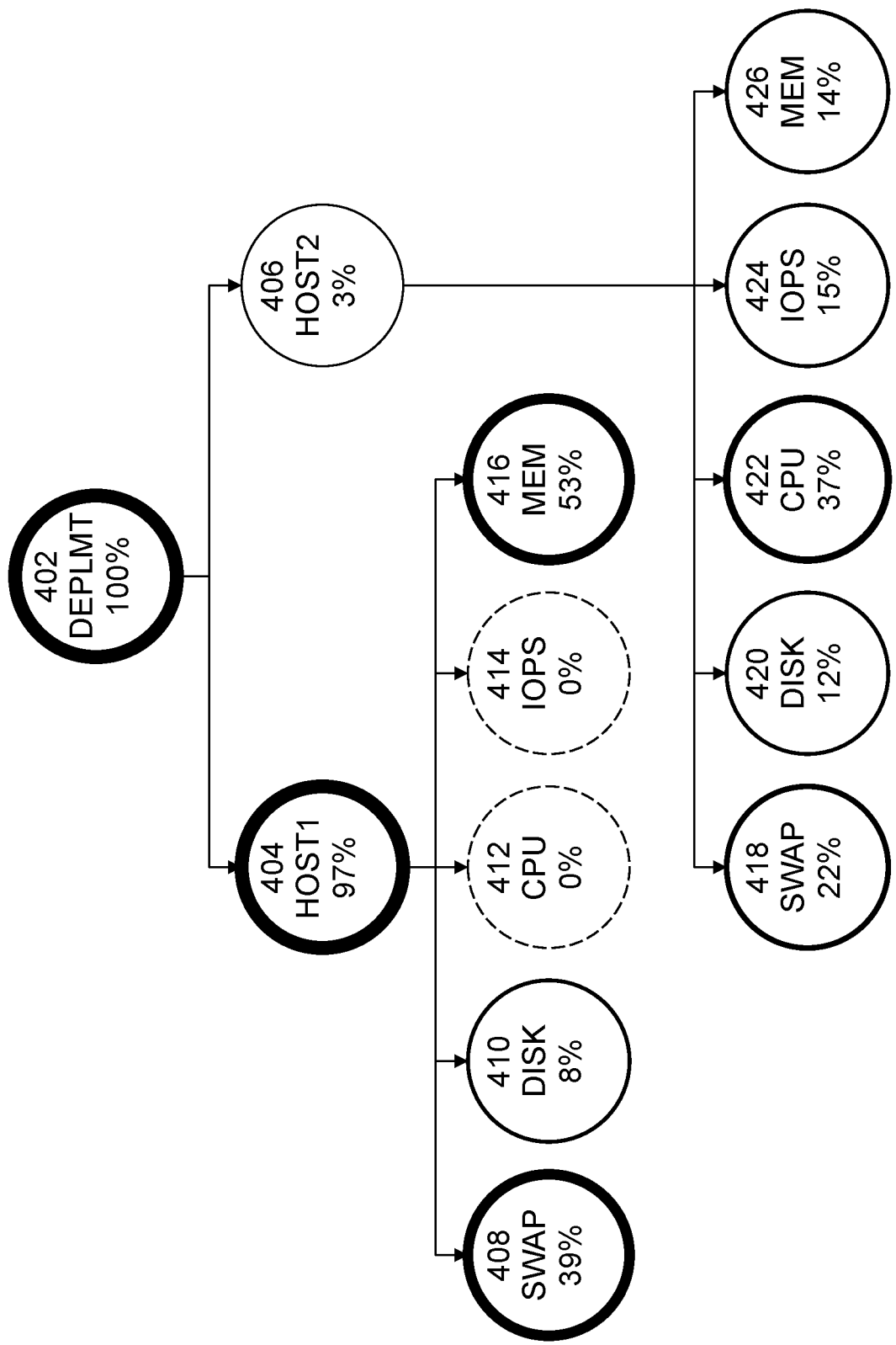
FIG. 4 illustrate an exemplary visualization of the topological tree according to embodiments of the present techniques.

Returning to FIG. 5, at 512, an alert to the end-user may be raised if any node at a depth up to max_alert_depth has a norm_anom_score of at least the alert_threshold. Such alerts may include a visualization of the topological tree, similar to that shown in FIG. 4, where each node may be labeled with its relative contribution to the anomaly score of its parent. The contribution value for a node may be calculated as its anom_score divided by sum of anom_score for that node and all of its siblings. The tree may be capped to, for example, the first 3 levels. Heavier outlined nodes contributed more to the anomaly score of their parent. As shown in FIG. 4, the thicker the outline, the greater the relative contribution, ranging from the thickest solid outline, such as 402, having the greatest contribution, to the thin dashed outline, such as 412, having the least contribution. For example, groups of contributions of nodes may include a highest contribution group of nodes 402, 404, a next contribution group of nodes 408, 416, a next contribution group of nodes 422, a next contribution group of nodes 410, 418, 420, 424, 426, a next contribution group of nodes 406, and a group of nodes with no contribution 412, 414.

At 514, the time t may be adjusted. If an offline scenario is being processed, than at 514, t may be increased according to the desired detection resolution and the process may loop back to 506 and continue. If an online scenario is being processed, then the process may wait, for example, a few seconds, then set t to the current time.

Figure 7:
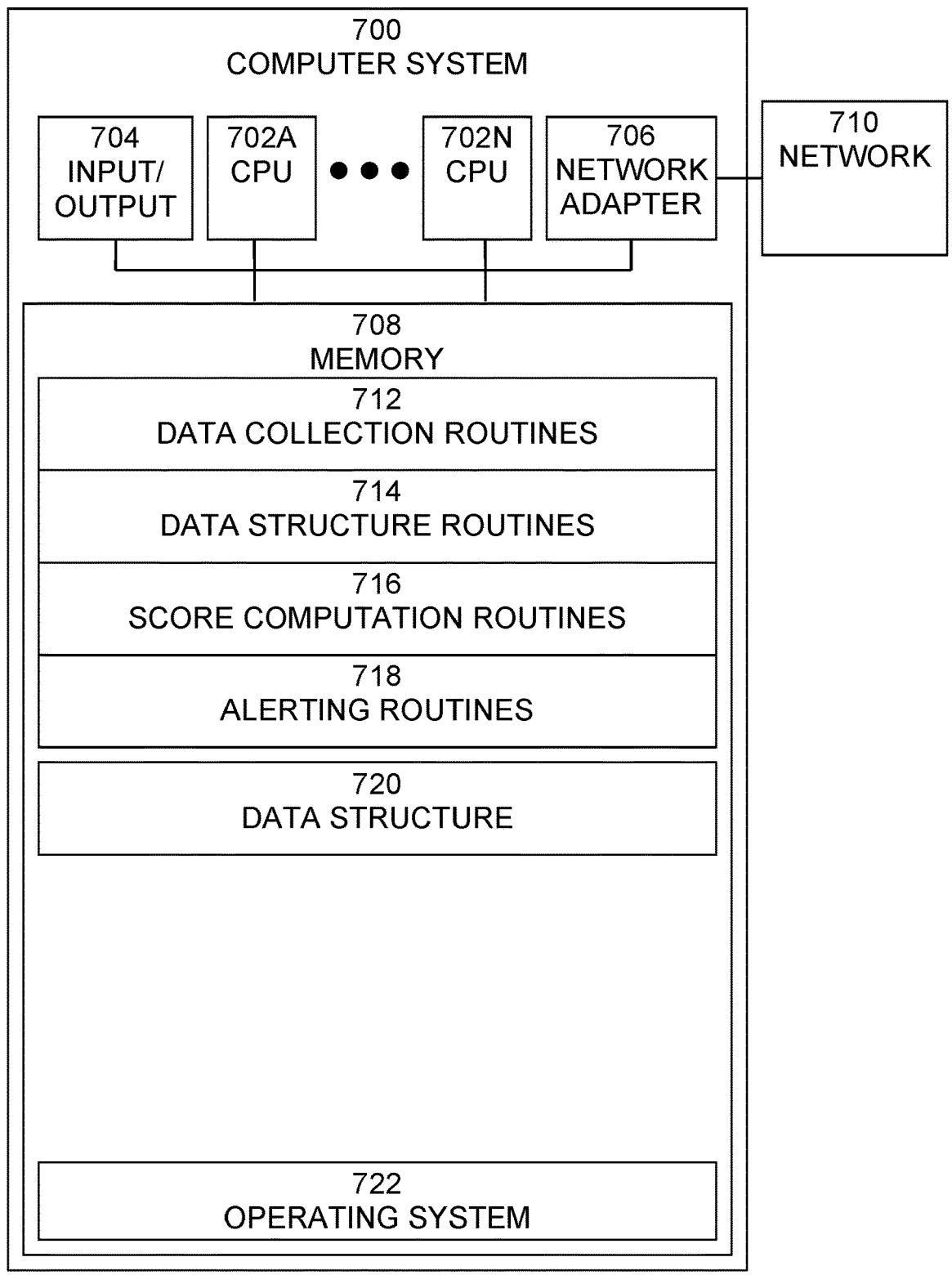
FIG. 7 is an exemplary block diagram of a computer system, in which processes involved in the embodiments described herein may be implemented.

An exemplary block diagram of a computer system 700, in which processes involved in the embodiments described herein may be implemented, is shown in FIG. 7. Computer system 700 may be implemented using one or more programmed general-purpose computer systems, such as embedded processors, systems on a chip, personal computers, workstations, server systems, and minicomputers or mainframe computers, or in distributed, networked computing environments. Computer system 700 may include one or more processors (CPUs) 702A-702N, input/output circuitry 704, network adapter 706, and memory 708. CPUs 702A-702N execute program instructions in order to carry out the functions of the present communications systems and methods. Typically, CPUs 702A-702N are one or more microprocessors, such as an INTEL CORE® processor. FIG. 7 illustrates an embodiment in which computer system 700 is implemented as a single multi-processor computer system, in which multiple processors 702A-702N share system resources, such as memory 708, input/output circuitry 704, and network adapter 706. However, the present communications systems and methods also include embodiments in which computer system 700 is implemented as a plurality of networked computer systems, which may be single-processor computer systems, multi-processor computer systems, or a mix thereof.

Input/output circuitry 704 provides the capability to input data to, or output data from, computer system 700. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 706 interfaces device 700 with a network 710. Network 710 may be any public or proprietary LAN or WAN, including, but not limited to the Internet.

Memory 708 stores program instructions that are executed by, and data that are used and processed by, CPU 702 to perform the functions of computer system 700. Memory 708 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 708 may vary depending upon the function that computer system 700 is programmed to perform. In the example shown in FIG. 7, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 7, memory 708 may include exemplary memory contents for client memory 712 and server memory 714. memory 708 may include data collection routines 712, data structure routines 714, score computation routines 716, alerting routines 718, data structure 720, and operating system 722. Data collection routines 712 may include software routines to collect data, such as maximum absolute anomaly scores, etc., as described above. Data structure routines 714 may include software routines to create, populate, trim, search, etc., a data structure 720, as described above. Score computation routines 720 may include software routines to perform computation of anomaly scores, as described above. Alerting routines 718 may include software routines to determine whether alerts should be raised and to raise such alerts, as described above. Data structure 720 may include data organized so as to form a desired data structure, such as a tree data structure, as described above. Operating system 720 may provide overall system functionality.

As shown in FIG. 7, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of anomaly detection in a hierarchical computer network, implemented in a computer system comprising a processor, memory accessible by the processor, and computer program instructions stored in the memory and executable by the processor, the method comprising:
    defining a tree-like topological structure which describes how the hierarchical computer network comprises sub-components, wherein each node of the tree-like topological structure represents a sub-component of the hierarchical computer network, and wherein at least some of the sub-components are monitored to generate signals indicating an operational condition of each sub-component;
    collecting a plurality of time-series of maximum absolute anomaly scores for each monitored signal;
    recursively computing an anomaly score for each node of the tree-like topological structure, bottom-up, by:
        collecting weights for all immediate child nodes of each node; and
        collecting anomaly scores for all immediate child nodes of each node; and
    reducing the anomaly scores into a single value using a variable aggregation function.

2. The method of claim 1, wherein the variable aggregation function comprises one of a weighted power mean function, an unweighted median, an unweighted percentile, a percentage of anomalies out of all child nodes, and a plurality of weighted aggregation functions.

3. The method of claim 2, wherein computing an anomaly score for each node further comprises determining a number of standard deviations by which the computed anomaly score for the node is above a mean anomaly score for that node.

4. The method of claim 3, further comprising raising an alert when a computed anomaly score for a node is above a mean anomaly score for that node by greater than a threshold number of standard deviations.

5. The method of claim 1, wherein the monitored signals are one of online wherein streaming data is available in real-time or near real-time or offline wherein time series of signal data have been stored.

6. A system for anomaly detection in a hierarchical computer network, the system comprising a processor, memory accessible by the processor, and computer program instructions stored in the memory and executable by the processor to perform:
    defining a tree-like topological structure which describes how the hierarchical computer network comprises sub-components, wherein each node of the tree-like topological structure represents a sub-component of the hierarchical computer network, and wherein at least some of the sub-components are monitored to generate signals indicating an operational condition of each sub-component;
    collecting a plurality of time-series of maximum absolute anomaly scores for each monitored signal;
    recursively computing an anomaly score for each node of the tree-like topological structure, bottom-up, by:
        collecting weights for all immediate child nodes of each node; and
        collecting anomaly scores for all immediate child nodes of each node; and
    reducing the anomaly scores into a single value using a variable aggregation function.

7. The system of claim 6, wherein the variable aggregation function comprises one of a weighted power mean function, an unweighted median, an unweighted percentile, a percentage of anomalies out of all child nodes, and a plurality of weighted aggregation functions.

8. The system of claim 7, wherein computing an anomaly score for each node further comprises determining a number of standard deviations by which the computed anomaly score for the node is above a mean anomaly score for that node.

9. The system of claim 8, further comprising raising an alert when a computed anomaly score for a node is above a mean anomaly score for that node by greater than a threshold number of standard deviations.

10. The system of claim 6, wherein the monitored signals are one of online wherein streaming data is available in real-time or near real-time or offline wherein time series of signal data have been stored.

11. A computer program product for anomaly detection in a hierarchical computer network, the computer program product comprising a non-transitory computer readable storage having program instructions embodied therewith, the program instructions executable by a computer, to cause the computer to perform a method comprising:
    defining a tree-like topological structure which describes how the hierarchical computer network comprises sub-components, wherein each node of the tree-like topological structure represents a sub-component of the hierarchical computer network, and wherein at least some of the sub-components are monitored to generate signals indicating an operational condition of each sub-component;
    collecting a plurality of time-series of maximum absolute anomaly scores for each monitored signal;
    recursively computing an anomaly score for each node of the tree-like topological structure, bottom-up, by:
        collecting weights for all immediate child nodes of each node; and
        collecting anomaly scores for all immediate child nodes of each node; and
    reducing the anomaly scores into a single value using a variable aggregation function.

12. The computer program product of claim 11, wherein the variable aggregation function comprises one of a weighted power mean function, an unweighted median, an unweighted percentile, a percentage of anomalies out of all child nodes, and a plurality of weighted aggregation functions.

13. The computer program product of claim 12, wherein computing an anomaly score for each node further comprises determining a number of standard deviations by which the computed anomaly score for the node is above a mean anomaly score for that node and the performed method further comprises raising an alert when a computed anomaly score for a node is above a mean anomaly score for that node by greater than a threshold number of standard deviations.

14. The computer program product of claim 11, wherein the monitored signals are one of online wherein streaming data is available in real-time or near real-time or offline wherein time series of signal data have been stored.

* * * * *